United States Patent [19]

Lawless

[11] 4,416,956

[45] Nov. 22, 1983

[54] APPARATUS FOR CARRYING OUT A CHEMICAL OR PHYSICAL PROCESS

[76] Inventor: Harold L. Lawless, P.O. Box 1287, Rapid City, S. Dak. 57701

[21] Appl. No.: 580,697

[22] Filed: May 27, 1975

RELATED U.S. APPLICATION DATA

[63] Continuation of Ser. No. 182,110, Sep. 20, 1971, and a division of Ser. No. 658,511, Aug. 4, 1967, U.S. Pat. No. 3,606,999.

[51] Int. Cl.² ................. H01M 8/02; H01M 8/04
[52] U.S. Cl. ................................... 429/15; 429/39
[58] Field of Search ............ 136/86 R, 86 E; 429/15

[56] References Cited

U.S. PATENT DOCUMENTS

| | | | |
|---|---|---|---|
| 2,384,463 | 9/1945 | Gunn et al. | 136/86 R |
| 3,288,648 | 11/1966 | Jones | 136/86 E |
| 3,433,675 | 3/1969 | Moullon | 136/86 R |
| 3,525,643 | 8/1970 | Spahrbier et al. | 136/86 E |
| 3,531,326 | 9/1971 | Stankovich | 136/86 E |
| 3,706,602 | 12/1972 | Miller | 136/86 R |

Primary Examiner—Donald L. Walton
Attorney, Agent, or Firm—Horace B. Van Valkenburgh

[57] ABSTRACT

This invention is essentially an improved means for contacting solids, liquids, and gases at elevated pressures and at desired temperatures, for providing inherently stable pressures, for conserving the heat of chemical reactions, and for minimizing the power requirement for pumping liquids continuously through a high pressure zone. The invention is particularly useful for processes utilizing physical, chemical, and/or thermal treatment, under elevated pressures, of continuously flowing streams of large volume which may contain suspended solids.

The invention is based on the realization that deep boreholes, suitably lined, can be utilized as a particularly efficient apparatus for physical, chemical, and/or thermal processes. The hydrostatic pressures created when the boreholes are filled with liquids or fluidized solids are of sufficient magnitude to promote a great many useful chemical reactions, and there are many other advantages, as partially noted later, that appear in a unique combination when deep boreholes are regarded as an item of process apparatus, rather than as a means of access to water, petroleum, or mineral ores.

The following processes are illustrative of the embodiments of this invention:

(1) The use of chemical reaction energy in the production of electricity directly by means of fuel cells. Through this invention, it is possible to produce electricity directly from powdered coal or other combustible solids, as well as from combustible gases or liquids.

15 Claims, 5 Drawing Figures

APPARATUS FOR CARRYING OUT A CHEMICAL OR PHYSICAL PROCESS

This is a continuation of application Ser. No. 182,110, filed Sept. 20, 1971, and a division of my copending application Ser. No. 658,511, filed Aug. 4, 1967, now U.S. Pat. No. 3,606,999.

This invention relates to chemical reactions and processes, and also to apparatus particularly adapted to carry out such reactions and processes, including but not limited to those involving either the continuous-flow or batch-wise contacting of gases, liquids and solids, in any combination. Specific examples of such processes comprise the production of electricity through fuel cells and the electrolytic production of chemicals, with or without their in situ utilization. This invention relates specifically to reactions and processes which are to be carried out at elevated pressures, which range upward to many thousands of pounds per square inch, and to the vessel and associated apparatus for carrying out such reactions and processes.

A description of the previous types of apparatus and the disadvantages thereof is contained in my aforesaid application Ser. No. 658,511 and are incorporated by reference herein.

Among the objects of this invention are to provide novel chemical reactions and processes involving particularly those which are to be carried out at relatively high pressures and elevated temperatures; to provide such reactions and processes which are carried out in a manner such that the size and hardness of solid material supplied to and/or removed from the reaction zone may be greatly in excess of that to which solid material supplied to a conventional pressure vessel is limited; to provide reaction zones of great depths which greatly extend contact between solid, liquid and gaseous reactants; to provide such reactions and processes which may be carried out with a minimum pumping power input that is much below that necessary in current practice; to provide such reactions and processes in which the problem of sealing entrances and exits to the reaction zone are minimized; to provide such apparatus which is adaptable to many different types of reactions and processes, including fuel cell power generations; to provide apparatus in which the reactions and processes of this invention are particularly adapted to be carried out; to provide such apparatus in which countercurrent heat exchange between incoming and outgoing material and among solid, liquid and gaseous reactants is readily effected; to provide such apparatus which may utilize preexisting structures; to provide such apparatus with inherently stable reaction zone pressures which remain unaffected by entry and exit of fluids and solids and corrosive materials; to provide such apparatus which may be readily varied in size and capacity, and which is suited for continuous or batch operation without increase in the problems of feed or withdrawal of material; and to provide such reactions and processes, as well as such apparatus, which will operate effectively and efficiently for the desired purposes.

This invention is based on the realization that the above objectives, in combination, can be obtained through the utilization of the hydrostatic pressure obtainable at depths sufficient to produce pressures obtainable in conventional apparatus only by mechanical pumping equipment. These depths are such that deep boreholes, many thousands of feet deep, which were formerly utilized only for access to water, petroleum or other minerals, have now found a new type of apparatus use.

The chemical reactions and the processes of this invention are thus carried out at elevated pressures by utilizing a hydrostatic head to furnish the desired pressure, thereby involving a vertically elongated reaction vessel. In principle, the reaction vessel is the hydraulic equivalent of a U-tube. Liquid feed enters the top of the vessel, progresses downward through increasing hydrostatic pressures, passes through the reaction zone, and the reaction products then exit upward through decreasing pressures to the surface. Solid and gaseous materials may also be passed into the reaction zone by modified procedures detailed later.

Such a reaction vessel is conveniently mounted in a vertical passage extending to a position within the earth at which the hydrostatic head will be sufficient to produce the desired reaction pressure, such as in excess of 1000 pounds. For instance, at a depth of 4310 feet, the hydrostatic head of a liquid having a density corresponding to water is approximately 1870 pounds per square inch. As will be evident, the depth at which the chemical reaction is to take place may be readily selected, so that the reaction pressure will be equal to or greater than the necessary minimum. The reaction vessel itself may be similar to the casing of an oil or gas well, so that abandoned or dry oil or gas wells are readily usable for such purpose. If desired, such wells may be enlarged by supplemental drilling, if the diameter at the depth desired is insufficient to accommodate the diameter of the reaction vessel; alternatively, large underground chambers may be mined and, if desirable, fitted with separate entrance and exit passages. In addition, construction on the surface may be appropriate where sufficient natural elevation is present; a mountainside, for example.

As will be evident, the pressure within such a vertically elongated reaction vessel is proportional to the depth and, at the surface, may be atmospheric or slightly above atmospheric. Thus, the liquid movement may be via gravity flow, without pumps, or via low pressure pumps, and a minimum pumping power is thus required because the pressure increase at the pumps is low; the product of the pressure increase and the volume rate will be small, even though the volume rate may be large and the reaction zone pressures are high.

The low input pressure permits use of relatively large diameter pipes, so that relatively large pieces of solid material, i.e. compared to the size which will readily pass through the valves and piping of a high pressure pump, may be introduced directly into the reaction zone; large pieces of solid materials also may be introduced directly into the top of such a vertically elongated reaction vessel.

Leakage and binding problems associated with seals and glands are avoided because the wires, rods or shafts used for agitation or measurements within the reaction zone have no effect on the hydrostatic pressure gradient that maintains pressure in the reaction zone; the gradient functions along the surfaces of these devices, just as it does in their absence. The pressure gradient also remains substantially unaffected by moderate volumes of gas, such as compressed air, that may be utilized for agitation or other purposes.

The hydrostatic pressure gradient also remains substantially undisturbed by fluid flow into and out of the reaction zone, by solids passing through the vessel, or by corrosive materials. Gas bubbles affect the gradient moderately, but their effect is proportional to the displacement of these bubbles, and can be allowed for the vessel design. Thus, pressure control is an inherent feature of this kind of vessel, and it is superior to existing pressure control mechanisms, for the reasons given.

Appropriate reactions can also be carried out in a fluid having a density greater than water, thereby reducing the total height of the pressure vessel. Furthermore, additional pressure can be added at the surface, i.e. at the top of the pressure vessel, to increase the hydrostatic head below, when such additional pressure does not interfere with the introduction of the feed.

Fluidized solids have many of the same hydraulic characteristics as liquids and, for that reason, are also suitable for use in this invention to provide reaction zone pressures and/or as reactants.

The reaction vessel of this invention is also inherently safer than high pressure vessels at the surface, since conventional mechanical pressure controls are not necessary. Any rupture at the bottom will be confined by the surrounding earth, while operators and the controls are remote from the high pressure zone at the bottom. Thus, reactions at high pressures can be conducted safely in or near population centers.

A number of advantages, in addition to those listed above, ensue when using a vertically elongated pressure vessel, particularly one extending into the earth, among them being the following:

Heat losses are greatly reduced because of the surrounding earth. In the event that loss of heat to the surrounding earth becomes a problem, the elongated pressure vessel may be insulated at the reaction zone, or a double walled vessel may be used at the reaction zone. In addition, hot gaseous or liquid products of the reaction may be removed through a pipe extending upwardly from the reaction zone and centrally of the reaction vessel, so as to be surrounded by the downwardly moving feed to the reaction zone, thereby providing efficient and effective countercurrent heat exchange, to preheat the feed. The balanced pressures existing throughout the vessel permits such pipes to be thin and thus enhances their heat exchange capacity and reduces their cost.

Where gases are generated internally in the reaction zone, they may be collected by a bell, similar to a diving bell, situated at the upper limit of the pressurized zone. These gases are available for continuous delivery at the upper end of the reaction vessel and at the pressure existing at their point of collection. Thus, they may be used to develop power just as if they were produced in a conventional pressure vessel.

The reaction rates of chemical reactions used to furnish electrical power from fuel cells may be increased through higher pressures and temperatures, rather than through the use of expensive catalysts, such as platinum. Thus, this invention provides larger power output from less expensive fuel cells. The fragile electrodes, used because of their efficiency in fuel cells, become feasible components of a high pressure system, in this invention, because such pressure is stable and balanced. In addition, the ordinary waste of kinetic energy of fluids leaving the fuel cells is not present; for instance, and electrolyte, recirculated to maintain its chemical composition, requires only a small amount of power for recirculation, even though its reconstitution is carried out at atmospheric pressure.

It is also possible to utilize this invention in the design of fuel cells that operate directly from liquid or solid fuels; conventional cells gassify such fuel, for example, coal, perior to its entry into the cell. Electrically conductive fuels such as carbon, may comprise one electrode in the fuel cell or fuels of any type may react at non-consumable electrodes. The invention is also adaptable to the design of more conventional fuel cells utilizing gaseous fuels.

As an additional feature, any accumulation of sludge or other insoluble material, below the reaction zone, may be removed continuously or intermittently, if desired, by an air or gas lift pump, or by any other kind of suitable pump located on the surface; siphons are equally suitable, provided the pressure vessel is extended to a sufficient height, say, ten feet or more, above the siphon outlet.

Other features of this invention, as well as the manner in which the above objects and requirements are met, will be apparent from the description which follows, taken in connection with the accompanying drawings, in which.

Figures 1, 2:
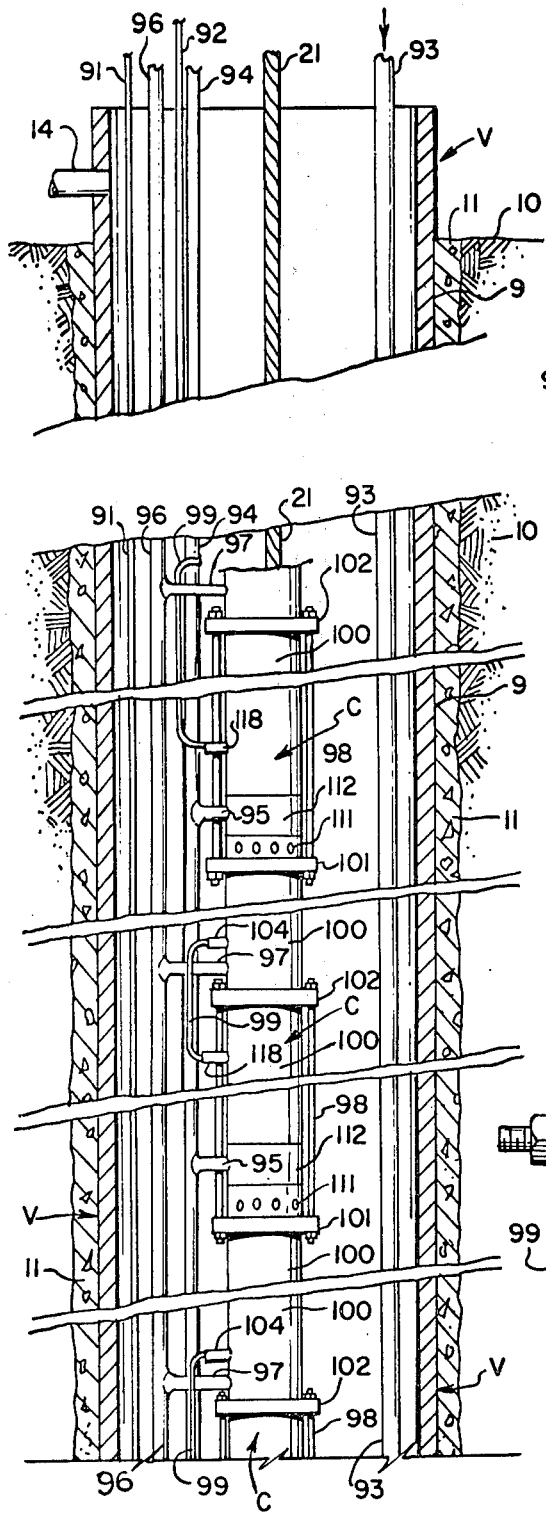
FIG. 1 is a condensed, vertical section, illustrating an embodiment of the apparatus of this invention particularly adapted to fuel cell operation wherein many solid, liquid or gaseous materials may be utilized to produce electrical power either through flameless combustion or through other types of chemical reactions.
FIG. 2 is a condensed, vertical section, on an enlarged scale, illustrating the construction of individual fuel cells of the fuel cell battery of FIG. 1 and which also involves a novel electrode of this invention.
Figure 3:
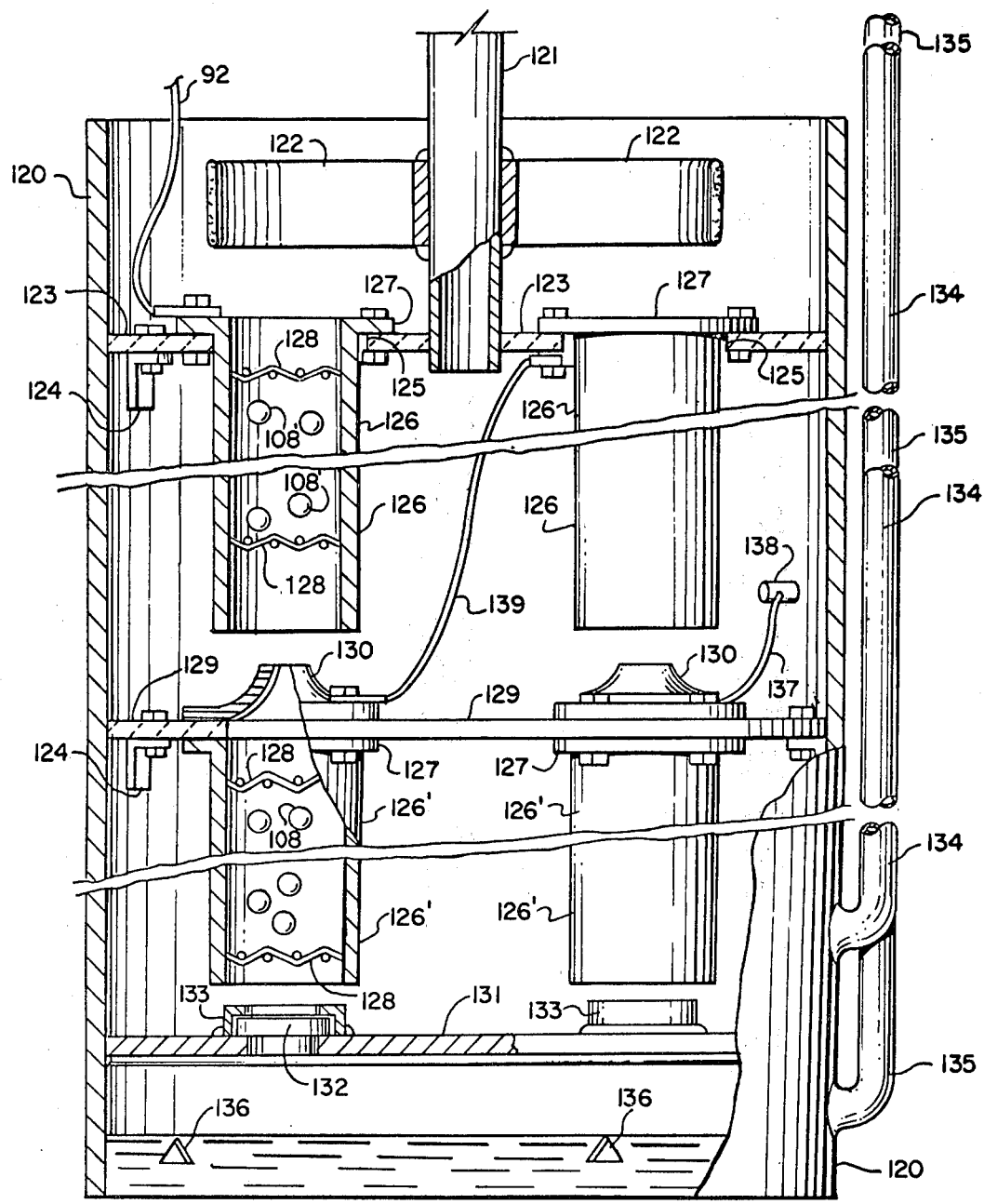
Figure 4:
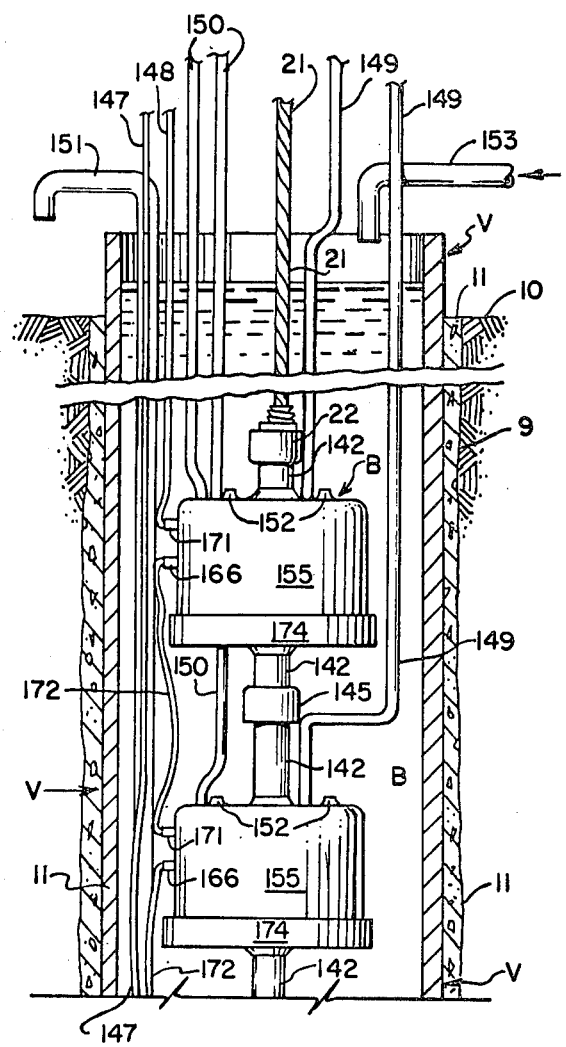
Figure 5:
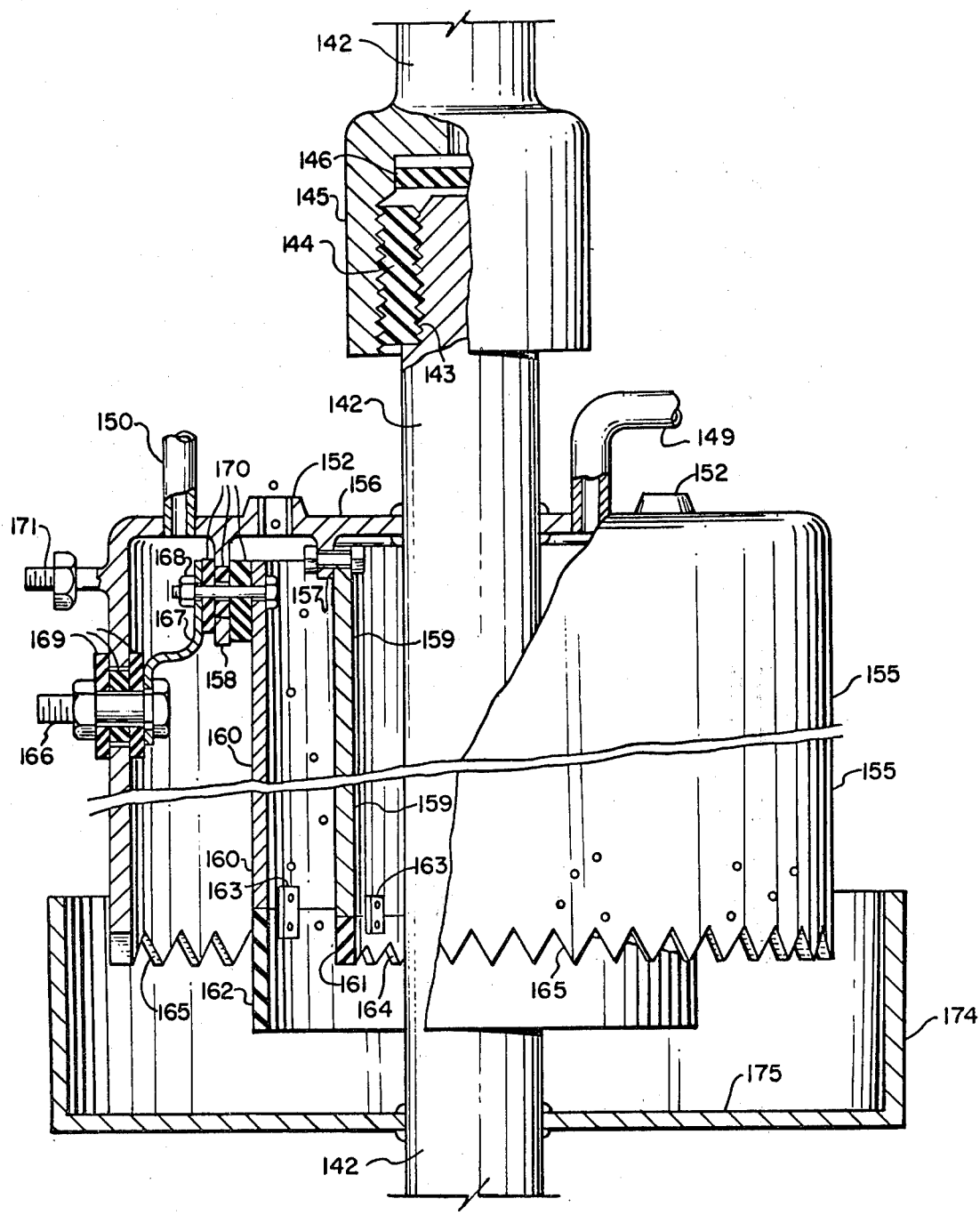

FIG. 3 is a condensed, vertical section of a modification of the fuel cell construction illustrated in FIGS. 1 and 2 and which is particularly suited to severe reaction conditions involving high temperatures and reactive chemicals which would destroy many electrical insulating materials and slight modifications of which adapt it to the use of relatively large dimensioned pieces of solid fuels, such as so-called peanut coal;

FIG. 4 is a condensed, vertical section, similar to FIG. 1, but illustrating an embodiment of the apparatus of this invention utilizing a fuel cell battery adapted to operation on gaseous fuels; and FIG. 5 is a side elevation, partially broken away and in vertical section, showing additional details of the construction of a typical fuel cell of the embodiment of FIG. 4.

Apparatus constructed in accordance with this invention is illustrated in FIG. 1 and includes a vertically elongated, upright reaction vessel V which is conveniently formed of connected tubular sections, similar to a well casing, with the tubular sections at lower levels being thicker, to withstand greater pressure, if desired. Reaction vessel V is installed within a well 9, drilled downwardly into the earth 10, with concrete 11 set around the reaction vessel within the well for support and reinforcement of the reaction vessel. The well 9 may be a dry well originally drilled in an attempt to penetrate an oil or gas deposit, used as drilled if of sufficient diameter, or enlarged in diameter to the extent necessary. As will be evident, if the well has been drilled through a hard, impervious strata, the casing shown as forming the reaction vessel V may be eliminated over such zones. However, such zones should be carefully selected, so that leakage through fractures, vugs or the like does not interfere with the desired operations. The lower end of the vessel V may be closed by a plug (not shown), while the upper end may extend above the surface of the ground surface 10 to a suitable height; generally such height is that necessary for a liquid height sufficient to provide sufficient flow through an outlet 14.

The apparatus of FIGS. 1–3 and FIGS. 4 and 5, to be discussed in detail later, deal with embodiments related to fuel cells and their operation. An understanding of these embodiments can be greatly clarified by an introductory discussion of fuel cell operational and design principles.

All fuel cells convert chemical reaction energy into electrical energy. Fundamentally, this conversion is accomplished by dividing the chemical reaction into two stages so that all electrons that are exchanged between the two reactants involved can be channeled through an electron conducting path, external to the reaction; this electron transfer comprises an electrical current capable of providing electrical power.

For example, without a fuel cell, the flameless combustion of carbon, in the presence of liquid water, can be represented as:

$$2H_2O + C + O_2 \rightarrow CO_2 + 2H_2O \tag{I}$$

As written, the above reaction I produces heat but the electron transfer involved occurs directly between transient ionic particles without electron passage through an external path. In a sense, the electron current is internally short circuited and cannot produce useful work.

With a fuel cell, however, the reaction can be divided into stages, as in IIA and IIB, below, which proceed simultaneously at the two electrodes and in each of which 4e$^-$ represents four electrons:

$$4e^- + O_2 + 2H_2O \rightarrow 4OH^- \tag{IIA}$$

$$C + 4OH^- \rightarrow CO_2 + 2H_2O + 4e^- \tag{IIB}$$

It will be noted that the net reaction, obtained by addition of IIA and IIB stage reactions, as above, is the same as reaction I. But by staging the reaction, an electron-conductive path has been introduced, so that all the electrons involved in the reaction will be directed along this path. The path will comprise the wiring and the electrical load, such as an electric motor, which is necessary to produce mechanical energy from the electric current; or the electric current may be used to perform chemical operations, such as electrowinning aluminum, or to perform any other conventional, electrically powered operation.

The complete electron circuit, for the fuel cell, comprises both the external electron conductive path, whereby electrons which originate at the first electrode are conducted through the electrical load to the second, and the internal, ionic conductive path, whereby electrons are removed from the second electrode, incorporated into ions such as the OH$^-$ ions of stage IIA, and returned to the first electrode by the internal movement of these ions from the second to the first electrode.

As written, reaction II is idealized, and would produce an amount of electrical energy exactly equal to the heat energy produced by reaction I.

In order to operate on the principles just outlined, all fuel cells should combine the following four fundamental characteristics:

(a) An energy producing chemical reaction (represented by reaction I in this description).

(b) A set of two electrodes; one capable of furnishing electrons to create ions and the other capable of accepting electrons from ions. All electrodes are obviously electron conductors.

(c) An internal path by which ions may move from one electrode to the other, in the required direction.

(d) An external, electron-conductive path comprising wires and the electrical load. This part of the fuel cell is not directly related to this invention, and it will not be detailed further than the leads or wires.

In connection with (a) above, the power capacity of a given fuel cell is directly related to the rate of the energy producing chemical reaction. Catalysts can be used with any electrode to increase the rate of most useful chemical reactions; ordinarily, such catalysts are incorporated into the electrodes and will vary with different electrodes and different reactants. Platinum group metals and nickel boride are examples of such catalysts.

High temperatures and high pressures comprise, in general, a means for increasing reaction rates which is, in principle, less expensive than catalysts, but the mechanical problems associated with high pressures and temperatures have led most fuel cell designers to rely on catalysts. Leakage around electrodes, pressure stability, and the maintenance of electrolyte composition, through water removal, for example, are representative of the mechanical problems associated with high temperatures and pressures in conventional pressure vessels. The hydrostatic pressure vessel greatly mitigates these machanical problems and permits temperature and pressure to be used instead of catalysts, although it does not exclude catalysts.

The chemical reaction in fuel cells occurs in an active region where there is mutual contact between the cell fluid, the electrode and the reactant. Thus, a third factor affecting fuel cell power levels is the rate at which reactants and reaction products enter and leave this active region.

In connection with (b) above, all electrodes, in common, are designed to deliver electrons to stage A of reactions, such as reaction II, and to remove them from stage B; the electrons are received by ions at stage A where the ionic electrical path begins and they are released by the ions at stage B where the ion path ends. Both of these electron-ion interactions require the presence of reactants, for example oxygen in stage A and carbon in stage B, and therefore the electrodes must permit intimate contact among the reactants, the electrons, and the cell fluid at both the beginning and at the end of the ionic path.

In addition to these chemical fundamentals, electrode configurations are also defined by the particular combination of the three parameters listed below that appears in a given fuel cell.

First. The physical state of the reactants:

These states include gases, such as hydrogen or oxygen, liquids, such as fuel oil or alcohol solutions, or solids, such as coal or coke. Mixtures of these physical states, such as gas-liquid or solid-liquid dispersions or liquid-liquid emulsions, can also be included. Oxygen-water, coke-water, and fuel-oil-water would be examples of such mixtures.

Second. The nature of the internal ionic path:

As discussed below in connection with (c), the cell fluid may be stationary or flowing, with respect to the electrodes, and it may or may not contain permanent ions in solution. Additionally, ion conducting solids may be employed.

Third. The temperatures and pressure of the fuel cell:

Electrode design is affected by sealing problems and by pressure surges which may occur at high pressures and temperatures. The pressure differential across conventional electrodes should be small and stable so that mutual contact between the electrode, the cell fluid and the reactant will be continuous at the operating temperature and pressure.

The conventional electrode is a stationary electrode, as distinct from the fluidized electrode described later. Such electrodes are made of porous carbon, or of sintered, powdered metals or metallic compounds. As a class, these electrodes are non-consumable and they ordinarily incorporate catalysts or are composed of catalysts unless cell pressures and temperatures are such that catalysts are not necessary. In fuel cells utilizing this class of electrode, a gaseous reactant diffuses from one direction into the electrode where it meets the cell fluid that diffuses into the electrode from the opposite direction; one reaction stage occurs at each electrode and the reaction rate is controlled by a combination of the reactant entry rate, the product exit rate, and the pressure, temperature, and catalytic effects that generally control chemical reaction rates.

A specialized electrode class comprises non-porous electrodes made of sheet platinum or platinum group metals; the only suitable reactant for this electrode class, at present, is gaseous hydrogen. In operation, hydrogen diffuses through the non-porous metal and becomes ionized; it thus supplies electrons to the external, electron conductive path and becomes capable of reacting with negatively charged ions from the ionic path within a fuel cell.

In addition to gaseous state reactants, solutions of reactants, such as alcohol or hydrazine can be used with porous electrodes. Such solutions are pumped through the electrodes and ions are formed or removed during the reactant's contact with the electrode.

However, when solid reactants are to be utilized, the fixed, porous class of electrode cannot be used except in the special case where it is also the reactant. To permit the reaction of solid reactants on non-consumable electrodes and to permit the continuous replacement of the material in a consumable electrode, two new classes of electrodes have been invented.

Broadly, both of these new classes are fluidized electrodes; that is, they comprise electrically conductive pellets which are fluidized by the upward passage of the cell fluid. The internal ionic path between such electrodes thus involves a flowing cell fluid as described below. The pellets may incorporate catalysts and they may have shapes other than spherical in order to improve the electrical contact among pellets during fluidization; for example, lengths of chain might replace the spherical shape. In one class of electrode, non-consumable pellets are made of metals or metallic compounds, with or without catalysts; this class of electrode utilizes reactants that are dispersed in the cell fluid. In a second electrode class, consumable pellets, made of an electrically conducting reactant, such as carbonaceous materials, are used instead of metallic pellets. For example, stage B of reaction II could occur at a fluidized, consumable electrode made of carbon pellets, although this stage is obviously equally suitable to solid or porous consumable electrodes.

Both new electrode classes are particularly useful in the hydrostatic pressure reactor because of the ease of feeding the dispersions or the consumable pellets into the reaction zone. Both classes of fluidized electrode are distinct from the porous electrode in that the pellets have a restricted but definite relative motion which permits dispersed solids to pass into and through the fluidized electrode. This direct feed of solids to a fuel cell is novel, and thus indicates that the fluidized electrode is novel. The fluidized electrodes obviously also readily permit passage of solutions and of gas and liquid dispersions as well as solid dispersions. A second advantage of the fluidized electrode with respect to the porous electrode is that the fluidized configuration permits an increase of the effective surface area that is necessary for ion formation and destruction; fluidized electrodes may have very great thicknesses because, unlike the porous electrode, the chemical reaction rates are not diffusion controlled. Since the pellets in fluidized electrodes may be made of the same material as porous electrodes, the surface area increase may be in the same ratio as the thicknesses of the two kinds of electrode.

Referring now to the third fundamental characteristic affecting fuel cell design, as (c) above, i.e. the internal ionic path by which ions move from one electrode to the other, ions may move through either liquids or solids. Water or a water solution is the most common but not the only liquid that conducts ions; ion exchange polymers comprise one of several classes of ion conducting solids.

Further ion conductance sub-classes can be defined wherein the liquid is stationary or flowing with respect to the electrodes. In this classification, that component of the liquid flow that is parallel to the ionic current is of major interest; the component of flow that is perpendicular to the ionic current will be neglected because its ion conductance effects are negligible.

These electrical effects rest on the fact that ionic movement through liquids is very slow, in electrical terms. For example, an electrical potential gradient of 20,000 volts per centimeter produces an ionic migration velocity through water of only about one meter per second. The voltage gradients between electrodes in fuel cells, by comparison, are not larger than perhaps 10 volts per centimeter, and the ionic velocities are therefore negligible with respect to the liquid in the cells. However, with respect to the electrodes, the ionic velocity will be essentially the same as that of the liquid. This is one factor leading to the fluidized electrode invention; such electrodes permit high liquid velocities between the electrodes in a fuel cell and hence high ionic velocities with respect to the electrodes.

A further class of ionic paths involves those cell liquids containing only transient ions that originate exclusively at one electrode and are discharged at the other electrode; these paths are distinct from those through liquids that contain permanent ions, in addition to the ions formed at an electrode, such as the ions from acids, bases, and salts.

When grouped in all combinations, these classes of cell liquids and ions define four kinds of internal ion paths for fuel cells, as follows:

A first path combines permanent ions and a flowing cell liquid.

A second path combines permanent ions and a stationary cell liquid.

A third path combines transient ions and a flowing cell liquid.

A fourth path combines transient ions and a stationary cell liquid.

Of the above four ion paths, the fourth path is of lesser interest because of its electrical resistance. It differs, in this respect, from the second path because of the number of ions present, rather than because of their transient or permanent character. Conductance of the cell fluid, measured in reciprocal ohms, increases as the number of ions, in a given volume, increases. The fourth path provides only a few ions because they can leave the electrode only by diffusion through a stationary liquid and because of their diffusion distance must equal the entire distance between the electrodes. The average diffusion distance for an ion in the second path, by comparison, decreases as the ion concentration increases, assuming passage of an equal number of electrons in the two cases.

The third path, however, represents a desirable means to reduce internal resistance in a fuel cell without dissolving electrolytes in the cell liquid to provide permanent ions. The third path differs from the fourth path because the bulk movement of the cell liquid sweeps the ions away from the electrode, where they were formed, and carries them to the other electrode. From the standpoint of cell construction, this ionic path has a unique advantage.

When the cell liquid contains few permanent ions, it behaves, in the absence of bulk flow, as an electrical non-conductor. This factor allows fuel cell batteries to be submerged in a common cell liquid without the formation of large, internal, parasitic electrical currents between the electrodes of different cells; electrical insulation of the cells may be found unnecessary where the cell liquid has few permanent ions; and such cells become suitable to severe reaction conditions that would destroy most electrical insulating materials.

The third path also has advantages from the standpoint of fuel cell operation. Basically, this advantage is that the reactant dispersion may pass continuously through the cells without the addition of or the loss of solutes, such as acids, bases and salts. Aside from the economic advantages, there is a secondary advantage because the cell effluent is not contaminated with permanent ions. For example, a continuously flowing waste stream, such as municipal sewage, can be used to generate power in third path fuel cells without increasing the dissolved salts concentration of the stream. In effect, the waste stream will be upgraded for subsequent use, while at the same time electrical power is generated.

In connection with the start of operation of third path cells, an external voltage may be applied to one electrode or to both of the cell electrodes in order to establish the initial supply of transient ions; thereafter the operating current and the transient ion supply will be maintained by the chemical reaction involved.

Fuel cells utilizing the third path for internal ion movement may be identified as transient electrolyte cells because there are no electrolytes in solution in the moving cell liquid. But this moving liquid conductance mechanism is not restricted to transient electrolyte cells; the presence of permanent ions will not prevent its operation and thus the first path is also a very useful internal ion path for fuel cells.

Both the first path and the third path are particularly suited to the use of fluidized electrodes and the advantages of these electrodes, in either path, include the following:

(1) Mechanical energy that is applied to maintain liquid flow serves also to reduce the internal electrical resistance of the fuel cells and also to depolarize the electrodes. In some cases, the gain in fuel cell power output thus obtained will offset the energy input and provide a net power gain. This will be particularly true of hydrostatic reactors where the energy necessary for cell liquid circulation is minimal.

(2) Cell liquid flow provides improved reactant-electrolyte contact because fluidized electrodes may have large areas and because the reactant-electrode contact rate is not limited by either reactant or ion diffusion rates through small passages, such as those in porous electrodes.

(3) The spacing between the two electrodes has less effect on internal electrical resistance than when the cell fluid is stationary. This factor simplifies construction of the fuel cells and permits reactants a better access to the electrodes. Contrary to conventional, porous electrodes in stationary cell liquids, reactants for these cells may be introduced between the electrodes so that they will be swept into and through the fluidized electrode by the moving cell liquid.

(4) The area of mutual contact between reactant, electrode, and cell liquid need not be static in cells with fluidized electrodes, as it must be in cells with static cell liquids. Thus, the internal pressures within cells with flowing cell liquids need not be closely balanced across the electrodes and electrode construction can be greatly simplified because fewer parameters, such as the relationship between porosity and catalytic activity, are involved.

The above advantages of the fluidized electrode and flowing cell liquid combination may be obtained whether or not they are combined with a hydrostatic pressure vessel; a solid fuel dispersion can be pumped into a conventional pressure vessel and other fuels present even less pumping problems. However, a fluidized electrode formed of coke or other conductive material may be found to be restricted by mechanical considerations to the hydrostatic pressure vessel.

The chemical reactions referred to above may be flameless combustion or any chemical reaction suited to fuel cells. The physical state of the reactants may prevent the operation of a particular reaction in a specific fuel cell, but chemically there is no difference in the principles of operation among the kinds of fuel cells described.

The fuel cell electrodes may be porous, fluidized, consumable or non-consmable. They may incorporate catalysts. The consumable electrodes may be impermeable, porous or fluidized. The fluidized electrode pellets may take shapes other than spherical in order to improve their electrical contact with adjacent pellets, and they may also be porous.

All combinations of these electrodes and ionic paths will operate to provide an electrical current if proper allowance is made for the physical and chemical requirements of the reactants. In combination with a hydrostatic pressure vessel, all such fuel cells have advantages.

In FIGS. 1 and 2 is shown a vertical battery of fuel cells C installed within a hydrostatic pressure vessel V, cells C being adapted for use with a flowing cell liquid in combination with non-comsumable, fluidized electrodes and submerged in the hydrostatic pressure vessel at depths at which, for example, the hydrostatic pressure is sufficient to maintain water in a liquid state at the temperatures necessary for rapid flameless combustion; other chemical reactions, such as that between hydrogen and oxygen, may require different temperatures and may utilize different depths. This combination of fuel cells and a hydrostatic pressure vessel enables the previously listed advantages of a pressure vessel to produce electrical power directly from any chemical reactions and from reactants in all physical states. Among the most useful of these states are solid dispersions, such as coal or coke in water; solid fuels cannot be used with conventional fuel cells, without prior gasification, but they may now provide a highly efficient source of electrical power in combination with this fuel cell and others illustrated herein. The hydrostatic pressure vessel V also permits pressures and temperatures to be increased economically so that high chemical reaction rates can be obtained which otherwise either could not be obtained or which would require platinum group or other catalysts. Thus, higher power levels can be obtained from cheaper fuel cells in this embodiment of the invention. The advantages listed above for fluidized electrodes and moving cell liquids are compounded with those of the hydrostatic pressure vessel in this embodiment. The use of fluidized electrodes, coupled with moving cell liquids, permits cell operation to be obtained with or without the presence of acids, bases or salts in solution in the cell liquid. The fluidized electrodes are suitable for producing electrical power directly from dispersions and/or solutions of oxidizable materials, such as coal or coke in water, or from combustible materials in waste streams, such as sewage sludge, paper pulp, or any other substance oxidizable by flameless combustion. They are also suitable for most chemical reactions that work in conventional fuel cells.

For purposes of illustration, the fuel cell battery will be assumed to utilize a coke dispersion in water as fuel, water as the flowing cell liquid, and air as the oxidant; the water is assumed to be substantially free of permanent ions from acids, bases and salts in solution, but electrode insulation is provided so that permanent ions, if present, would not conduct large internal parasitic currents between different cells of a fuel cell battery, and so that acids, bases or salts could be dissolved in the cell liquid, if desired.

As indicated, the pressure vessel V may be formed from connected sections, installed within a bore 9 in earth 10, supported by grout or concrete 11 and provided with an outlet 14. The battery of fuel cells C may be supported by a cable 21 and connected by insulated electrical cables 91 and 92 with the electrical load on the surface, while the pressure vessel V is filled with the cell liquid which will contain reaction products dissolved or dispersed therein. A fresh cell liquid feed pipe 93 extends downwardly alongside the fuel cells and supplies water or reconstituted cell liquid to the bottom fuel cell directly or to the bottom region of the pressure vessel V, which also contains the inlet to the lowest cell.

In this example, water is supplied directly or indirectly to the lowermost cell through pipe 93 and flows upwardly through the fuel cells C, in succession. This stream supplies part of the bulk cell liquid flow for the movement of ions between electrodes; water in the coke dispersion supplies the remainder. All the liquid inside the cells flows into the pressure vessel at one point or another and it may then be either discarded or reclaimed for recycling through pipe 93.

A reactant fuel pipe 94 also extends downwardly alongside the fuel cell battery and is connected by a branch pipe 95 to each cell at a position between the two fluidized electrodes. In this example, the fuel is a coke dispersion in water, and this dispersion should be a poor electrical conductor in order to minimize parasitic currents between cells; to this end, the dispersion may be dilute and/or the coke particles may be coated with a thin, adsorbed layer of oil or other electrically nonconducting substance. Further, in this connection, pipe 94 should preferably but not necessarily be formed of electrically insulating material, such as glass, and it should have a minimum cross sectional area to increase the electrical resistance of the dispersion for a given length of pipe. The liquid flow rate where branch pipes 95 enter the cells should be sufficient to prevent ions leaving the cells, particularly if pipe 94 is a conductor.

A reactant gas feed pipe 96 also extends downwardly alongside fuel feed pipe 94, and, in this example, supplies air to the lowest, fluidized electrode of each cell, through a branch pipe 97. In principle, oxygen or any oxygen containing gas could be used; more generally, any reactant capable of chemically combining with carbon could be used. The fuel cells of the battery are held together by a series of tie rods 98, and all fuel cells are electrically connected in series by insulated electrical conductors 99 to form a battery, with cable 91 extending to the lowermost fuel cell and cable 92 extending from the uppermost fuel cell.

Each fuel cell includes an electrically insulating cylindrical housing 100 having a lateral flange 101 on the outside at its upper and end to which the tie rods from the upper adjacent fuel cell housing are attached, and a second lateral flange 102 from each of which a set of tie rods 98 extends downwardly to attach at the flange 101 of the next lower, adjacent fuel cell. Housing 100 may be porcelainized metal, ceramic material, or other suitable electrically insulating material. Opposite each branch pipe 97, leading from the air feed pipe 96, is a gas fed, hollow cylindrical, electrically conductive pellet holder 103 which is disposed centrally of housing 100 and, as required, is connected by an electrically conducting rod 104, through either conductor 99 to a lower cell of the battery or through conductor 92 to the electrical load. An electrical insulator 105, placed below each pellet holder 103, also serves to accelerate cell fluid flow between fuel cells by constricting the flow area through an orifice 106; optionally, insulator 105 may instead be an electrical conductor that performs the same electrical function between series connected cells as conductor 99.

Air or other gas supplied through branch pipes 97 will flow into each housing 100 and then into the interior of pellet holder 103 through radial holes 107 therein, where it contacts both the cell liquid and the pellets 108 that are disposed within the pellet holder 103. This combination of pellets 108 and pellet holder 103 is one fluidized electrode called, in this example, the air electrode. The oxygen in the air is dispersed in the water and, through acquisition of electrons, largely from the pellets 108, enters an ionic form, such as $OH^-$ or $OOH^-$, by means of the electrons that are supplied from the external electron path. These ions are swept upward toward the other electrode by the flowing cell liquid. This flow is largely maintained by the gases inside pellet holder 103, principally nitrogen, which forms bubbles and provides an air lift type of pumping action, up through pellets 108 in holder 103. This pumping also draws cell liquid and ions up through the fluidized electrode of the next lower cell and, in addition, draws in the fuel slurry as described below. In the lowermost cell of the battery, water is drawn in, either directly from pipe 93 or from the lower region of vessel V, rather than from the lower cell. If desired, the circulation rate of liquid through the cells may be increased by a pump, as at the surface, which pumps the water downwardly through pipe 93 to increase the cell liquid pressure gradient throughout the battery. A pair of similar retainer screens 109 are located at each end of pellet holder 103 to prevent the pellets from being swept out of the holder by the flowing cell liquid.

Pellet holder 103 extends upwardly within an electrically insulating sleeve 110, at the upper end of which a series of radial vent holes 111 are provided to vent nitrogen and non-ionized oxygen gas bubbles from the air electrode, unreacted material from lower electrodes, reaction products, and cell liquid, directly into the cell liquid, filling vessel V in which the battery is submerged.

The fuel slurry enters the fuel cell through branch 95 leading from feed pipe 94 and into the central bore of an electrically non-conducting, reactant entry ring 112, located between the electrodes of each cell. Ring 112 is provided with a depending tubular extension 113 having a smaller bore, at the lower end of which is mounted a screen 114, as by a screen retaining ring 115, which separates gas bubbles and entrained particles, such as fly ash, from the cell liquid leaving the air electrode and deflects them toward the vent holes 111. The constricted cross sectional area inside extension 113 serves to increase the velocity of cell liquid flowing between the two electrodes, if necessary. The desired velocity is the minimum, consistent with a given power output level of the cell, necessary to sweep ions against the existing voltage gradient between electrodes.

The cell liquid, carrying oxygen ions formed at pellets 108 of the air electrode, flows through screen 114 and into the bore of ring 112 where it mixes with fuel drawn into ring 112 from branch pipe 95. But, effectively, there is no chemical reaction until the fuel and the ions move above ring 112 and reach pellets 108', in a sleeve-like, tubular pellet holder 116 of an upper or fuel electrode, which will conduct the electrons from the ions back to the air electrode of the same or of an adjacent cell. Thus, stage A of reaction II occurs at the air electrode in pellet holder 103, below ring 112, and stage B of reaction II cannot occur until the mixture of fuel and ions is swept by the flowing cell liquid into contact with pellets 108' above ring 112. Pellet holder 116 is clamped against ring 112 and is mounted within housing 100 with a screen 117 at each end to retain therein the pellets 108', which may be formed of the same or similar, or different, constituents as the pellets 108' of the air electrode. Pellet holder 116 is electrically connected by a rod 118 and cable 99, or with cable 92 of the uppermost cell. The passage of electrons from the fuel electrodes to the air or oxygen electrodes of each cell constitutes the electrical output of the battery; useful work can be obtained by passing this electrical current through a suitable electrical load.

The fuel cell battery construction of FIG. 3 is a modification of that shown in FIG. 2, being particularly suitable for the case where the cell liquid contains substantially no permanent ions and, as described later, where large pieces of solid fuel, such as coal or coke, are to be utilized. A battery of fuel cells is submerged in the cell liquid, in this construction, but parasitic currents between cells are acceptably low because the cell liquid is electrically a non-conductor or a poor conductor, particularly in view of the low voltage gradients existing within the battery. Thus, the electrodes need not be electrically insulated as in FIGS. 1 and 2, and the battery thus becomes suitable to active reactants and severe reaction condition that would destroy many chemical insulating materials. FIG. 3 shows, as an illustration, two fuel cells placed within an elongated cylindrical shell 120 submerged to a desired depth within the pressure vessel, which may be similar to the pressure vessel hereinbefore described. Normally, several fuel cells would be added to the two shown in order to obtain higher battery voltages. The shell 120 is supported by a feed pipe 121, for use of such reactants as waste streams, pulp slurries, coke slurries or the like, as by a multiple armed bracket 122 attached between the inside of the shell and the outside of the pipe 121, as by welding, as shown. Additional supporting cables may be utilized, such as cables extending downwardly alongside pipe 121, if desired. Also, shell 120 may be made in sections connected together in a manner similar to a well joint casing, or in any other suitable manner, in order to facilitate parts installation and removal, as for inspection or repair. The fuel slurry pipe 121 terminates below a circular, electrically non-conducting partition 123, through the center of which the pipe 121 extends and which is attached to shell 120 in any suitable manner, as by clips 124. Partition 123 is provided with a series of holes 125 surrounding pipe 121 to accommodate an upper series of pellet holders 126, of which two are shown. Each holder 126 is attached to partition 123 by means of bolts through a flange 127, or in any other suitable manner. Each pellet holder 126 is an electrical conductor and is provided with a screen 128 adjacent to both the upper and lower ends, to retain within the holder a plurality of pellets 108' formed of a suitable, electrically conductive material, as described previously. As before, the combination of each pellet holder 126 and the pellets 108' comprises a fluidized electrode.

An intermediate partition 129 is installed in vertically spaced relation within the shell 120 in a manner similar to partition 123; partition 129 is also an electrical insulator and otherwise corresponds to partition 123 except for the hole in the center of the latter which accommodates pipe 121. Pellet holders 126', containing pellets 108, and provided with screens 128, are mounted beneath and supported by partition 129 with the flange 127 of each holder, if desired, being on the underside of the partition to accommodate more readily a nozzle 130 at the top of each sleeve electrode, which accelerates the upward, linear flow of cell liquid from each electrode to the one above. Adjacent the lower end of the shell 120, a lowermost partition 131 is installed fc- supporting a series of gas spargers 132 which may be, for example, discs of porous alundum or of powdered, sintered metal. Each disc is mounted within a retaining ring 133 which, in turn, is mounted on partition 131 directly beneath the corresponding pellet holder 126' thereabove.

Pure water or water substantially free of oxidizable materials and permanent ions, is supplied through a pipe 134 which extends downwardly alongside shell 120 and communicates with the space inside the shell between partitions 129 and 131. An air or other oxygen containing gas supply pipe 135 extends downwardly alongside shell 120, such as just behind pipe 134 in FIG. 3, for introducing air or other oxygen containing gas below partition 131 from where it passes through spargers 132 and contacts pellets 108 in a lower pellet holder 126' in order to produce OH− ions as in stage A of reaction II. The lower end of shell 120, below lowermost partition 131, is provided with a series of apertures 136 for controlling the level of gas therewithin and thus the gas pressure differential across spargers 132; lower locations for the apertures 136 will provide higher pressure differentials.

The electrodes of this modification operate substantially in the same manner as described above in connection with the corresponding electrodes of FIGS. 1 and 2; the lower air electrodes are attached to partition 129 and the upper fuel electrodes to partition 123. Air passes through spargers 132, which serve to balance air input among the lower air electrodes. In passing upward and contacting both water, from pipe 134, and pellets 108 of the air electrodes, oxygen forms negative OH− ions by the mechanism previously described; the water flow, developed by gas lift pumping action, sweeps these ions into the upper, stage B or fuel electrodes where the combustible material from pipe 121 is contacted and the stage B reaction is completed.

The electron conducting path in this battery comprises conductor 92 and pipe 121, both leading from the electrical load at the surface, support 122, shell 120, a conductor 137, a terminal 138, and cell connecting wires 139, as well as the pellets 108 and 108' and the pellet holders 126 and 126'. The electrically conducting ionic path comprises ions transported by the bulk liquid flow from the lower to the upper electrodes. The water effluent from the battery mixes with water in vessel V and overflows therefrom with its original organic content largely oxidized. The fuel cell battery of FIG. 3 is compact and is therefore suitable to operation within conventional pressure vessels, as well as hydrostatic pressure vessels, when such factors as portability make a conventional pressure vessel desirable in spite of its previously described inefficiencies.

In addition to the manner of operation described above for the fuel cell modification of FIG. 3, this cell is also suitable for operation with consumable, fluidized electrodes, particularly inside a hydrostatic pressure vessel V. In this application, the necessary modifications would consist only of removing the upper screens 128 and the pellets 108' from the top fuel electrodes attached to partition 123. The lower screens 128 would remain and the air electrodes attached to partition 129 would remain entirely undisturbed. The feed stream through pipe 121 would be discontinued. In operation of this modification, the battery would be submerged to a suitable depth in a hydrostatic pressure vessel so that flameless combustion could proceed, and pellets of coke or coal or other electrically conducting fuel would be dropped into the top of the vessel and allowed to sink downward and fall into upper pellet holders 126. As described previously for other fuels, electrical power could then be produced by the stage flameless combustion of these pellets. Fly ash or similar unreacted material would be flushed out of the pellet holders by the moving cell liquid and removed from vessel V by circulating the liquid through a filtration and/or other reconstitution operation.

The feed mechanism is particularly convenient because as the pellets are consumed, more can be easily dropped in the top of the vessel. This modification of the fuel cell should also be considered as a means to save the grinding costs necessary to form dispersions from large pieces of solid fuel.

In the fuel cell embodiment of FIGS. 4 and 5, porous, non-fluidized electrodes are combined with a substantially stationary cell liquid, in the sense defined above, containing permanent ions in solution. The fuel cell battery obtains a high power output by virtue of the high pressures and temperatures conveniently obtainable in the hydrostatic pressure vessel V. Because of pressure balance existing throughout the vessel, the electrodes do not require elaborate mechanical support, although they operate at high pressures. The pumping economy of the hydrostatic pressure vessel permits reaction products, such as water, to be continuously removed and it greatly simplifies reconstitution of the electrolyte. All fuel cells are submerged under the electrolyte and all escaping gas is thus immediately isolated from larger volumes of gas in the cells, so that such fuels as hydrogen and oxygen can be used more safely than in conventional cells.

In FIG. 4 is shown a series of bells B, each comprising one fuel cell of the battery; the bells are disposed in vertically spaced relation within the pressure vessel V. Again, vessel V may be formed in sections, as in the manner of a well casing, and installed within a bore 9 in the earth 10 and sealed or maintained in position by grout or cement 11. Each bell B has a slightly negative buoyancy when filled with gas and is therefore suspended by support rod 142. Cable 21 may be attached to support rod 142 of the topmost cell by means of clamp 22 and utilized to suspend the battery of cells at suitable depths in vessel V. As in FIG. 5, support rods 142 are constructed to provide electrically non-conducting joints between cells. The upper end of each rod 142 has threads 143 engaging the interior threads of an insulating bushing 144 which, in turn, has exterior threads which engage the interior threads of a socket 145 formed at the lower end of each support rod 142. An insulating disc 146 is placed within the joint, to prevent any electrical connection between the rods. An electrical cable 147 extends downwardly to one electrode of the lowermost fuel cell and another electrical cable 148 is connected to one electrode of the uppermost cell which is opposite in electrical sign to that connected to cable 147; both cables 147 and 148 are connected to the electrical load on the surface. The intermediate cells are electrically connected in series, as described later.

An individual set of pipes 149 and 150 extends downwardly to each of the fuel cells, as illustrated in FIG. 4, in order to supply a reactant gas through each piper to appropriate electrodes in the respective bells. Pipe 149 delivers air and pipe 150 delivers hydrogen, in this example Individual sets of pipes simplify delivery of gases at the different pressures necessary for each bell, but an obvious alternative is to pipe the cells so that the gases can be circulated from the bottom cell, upward through each cell of the battery, and from the top cell back to the compressor. This arrangement would require additional piping, not shown, linking together the anode and cathode reactant chambers of adjacent cells.

Liquid electrolyte is withdrawn from the lower region of pressure vessel V, through a pipe 151, and delivered to the reconstitution apparatus, not shown but located on the surface, in order to remove reaction products, such as water. Reaction products are carried from each cell by flow of the electrolyte upward through vents 152 which extend through the top of each bell and communicate with the annular space betwen the two circular electrodes; thus the reaction products from all cells mix with the main body of the electrolyte in vessel V. Reconstituted electrolyte from the apparatus on the surface is returned to vessel V via a pipe 153, where it becomes available to all the fuel cells in the battery.

Each bell B, as in FIG. 5, may include an elongated cylindrical housing 155 having a suitable length, such as 10 or 20 feet or more, and open at the bottom, but closed at its top 156. The housing length depends primarily on electrode permeability; each foot of length of the housing 155 adds a pressure differential of about ½ pound per square inch across the electrodes; eventually, increased pressure differentials will cause reactant gases to pass entirely through the porous electrodes and stop the reaction involved. However, this differential should be distinguished from the absolute pressure which affects the chemical reaction rates and which may be several thousand pounds per square inch.

Support rod 142 extends through the center of the housing top 156 and a spaced pair of annular flanges 157 and 158 extend downwardly from the underside of the top. The top of the housing may be attached to support rod 142 in any suitable manner, as by welding, as shown. Attached to the respective depending annular flanges 157 and 158 is an inner cylindrical electrode 159 and an outer cylindrical electrode 160, each having attached thereto, at the lower end, an electrically non-conducting reactant separator 161 and 162, respectively. Electrodes 159 and 160 are porous and may be formed of any suitable electrode material according to well known procedures, such as those in which a porous, non-consumable, non-fluidized electrode is formed of platinized carbon, nickel, nickel boride or any other suitable material. Separators 161 and 162 may be formed of suitable electrically insulating material and attached to the lower edge of the respective electrodes in a suitable manner, as by clips 163. The lower end of outer separator 162 extends below the inner separator 161 and the lower edge of the latter is provided with a series of notches 164 for maintaining the level of gas therein, down to the notches, and to circumferentially distribute the bubbles of gas, such as nitrogen from the air, as it is displaced from the electrode space. Also, separator 162 extends below the lower end of housing 155, while the lower end of the housing is provided with a series of notches 165, for the same purpose as notches 164. The relative depths of the lower edges of parts 162, 164 and 165 have been chosen to prevent mixing of reactants, such as hydrogen and oxygen, within the fuel cell.

The electrolyte circulation necessary to remove reaction products is accomplished in the following manner: In this example, electrode 159 is the air electrode and nitrogen, being chemically inert, passes out the bottom of the electrode compartment, normally through notches 164 in separator 161, and bubbles up between the electrodes 159 and 160. These bubbles establish a gas-lift pumping action so that electrolyte flows upwardly between the electrodes and carries the reaction products, such as water, out through vents 152 in the top of the respective bell, where they mix with the main body of the electrolyte in vessel V, as previously described. This electrolyte flow is perpendicular to the ionic current between the electrodes and therefore has little effect on the electrical resistance of the ionic path; the major effect on cell performance is that the removal of reaction products and heat from the electrodes helps maintain a high power level. Electrode 160 is the hydrogen or fuel electrode and very little gas will be vented from the space around this electrode, unless impure hydrogen is used. When present, inert gases will be displaced from the hydrogen electrode chamber and pass through notches 165 and bubble to the surface of the vessel V.

The electron conducting path within each cell comprises the following structural elements: An electrical terminal 166 is connected with electrode 160 of the cell through a conductor bar 167 which makes contact with the electrode through one or more of the electrode attachment bolts 168, which may be disposed in circumferentially spaced rows around electrode 160 as required for mechanical support. Terminal 166 is insulated from the housing, as by insulating discs 169, while each electrode attachment bolt 168 is also electrically insulated from the flange 158 by insulating discs 170. Electrode 159 is electrically connected to housing 155 by flange 157 and thus to a terminal 171, which extends outwardly from the housing. Terminal 171 may be connected to a terminal 166 of an upper bell, as in FIG. 4, by means of a conductor 172; any reasonable number of such cells may be so connected. Other possible electrical arrangements, such as multiple sets of series connected cells in one vessel V, will also be apparent.

Below each bell B is a bubble deflector comprising a skirt 174 and a bottom plate 175 which is attached centrally to the support rod 142, as by welding, as shown. This bubble deflector deflects gas bubbles escaping from a lower cell to prevent their entering the electrode compartments of higher cells and producing undesirable mixtures.

During operation of the fuel cell battery, according to this exmple, air is pumped into the upper end of each bell, in the space between support rod 142 and electrode 159 by an air pipe 149. During operation, air fills the space inside electrode 159 and diffuses into the electrode pores; the oxygen will largely be ionized, as in stage A of reaction II, through mutual contact with the electrolyte and electrode 159. Inert gases and non-ionized oxygen pass under the bottom of insulator 161 and bubble through notches 164, to enter the space between the electrodes 159 and 160 and provide the electrolyte gas-lift pumping action previously described. Hydrogen is pumped through pipe 150 and into the annular space between housing 155 and electrode 160. The hydrogen diffuses into porous electrode 160 to become ionized through mutual contact with the electrolyte and electrode 160. With the given reactants, hydrogen ions always react with hydroxyl ions. When the electrolyte is basic, the reaction occurs near electrode 160; with an acid electrolyte, the hydrogen ions diffuse from electrode 160 and react with hydroxyl ions as they are formed near electrode 159. This oxidation of hydrogen corresponds to stage B of reaction II, except that hydrogen replaces carbon; water is the only reaction product and it is removed by circulation of the electrolyte as described. The ionic current carriers are hydrogen or hydroxyl ions, each of which carry a portion of the current that is roughly in accordance with their concentrations in the cell liquid.

In this embodiment, the cell liquid may contain high concentrations of permanent ions, from acids, bases, or salts in solution, so as to be a good electrical conductor. Therefore, all surfaces in contact with the cell liquid, such as those of bell B, rod 142, socket 145, skirt 174 and bottom plate 175, should be electrically insulated. Glass or Teflon coatings are examples of suitable materials.

As a class, the embodiments of this invention involving fuel cells have the advantage of simplicity in construction and in operation. There is an absence of mechanical sealing problems because liquid seals can be used throughout, and the pressure balance which exists throughout the vessel permits the utilization of thin, unsupported electrodes and/or membranes, although the absolute pressures may be extremely high. Also, as desired, solid fuels of large diameter easily pass into the reaction zone and unreacted materials are easily removed therefrom. In addition, the pumping economy inherent in this invention allows cell fluids to be either regenerated or, if desired, passed continuously through the apparatus.

In the foregoing embodiments, liquids have been used to provide hydrostatic pressures. But, as mentioned previously, fluidized solids have many of the same hydraulic characteristics as liquids and may therefore be used to provide hydrostatic pressures. The fluidizing agent may be a liquid or gas, for instance, supplied through a central pipe. The solids and the fluidizing agents may be chemically reactive or inert or mixtures of the same.

The preceding embodiments illustrate the invention but do not comprise its scope. The invention is, generically, a method and apparatus which provides intimate contact and/or promotion of chemical reactions among solids, liquids and gases, in any desired combination, at elevated pressures that are obtained from substantial depths of liquids or fluidized solids, as well as at desired temperatures. This operation is fundamentally different from conventional apparatus in that, in this invention, pressures are continuously graduated between atmospheric pressure and the reaction zone pressure; all streams, passing through the reaction zone, pass through this continuous gradient in both directions. In contrast, conventional apparatus utilizes a container wall to establish a large pressure discontinuity where atmospheric pressure abruptly changes to reaction zone pressures; all streams passing through the reaction zone in a conventional pressure vessel must cross this discontinuity in both directions. There are further distinctions in that gravity maintains the continuous pressure gradient and hence the reaction zone pressure in this invention and in that solids pass easily through the liquids or fluidized solids. The combination of advantages listed previously all stem primarily from the continuous pressure gradient and the other factors just described. The advantages are not obtainable in conventional reaction vessels primarily because of the pressure discontinuity, just described, that is characteristic of such vessels.

Although several embodiments of this invention have been illustrated and described and certain variations therein indicated, it will be understood that other embodiments may exist and that various changes may be made therein, all without departing from the spirit and scope of this invention.

What is claimed is:

1. Fuel cell apparatus comprising:
an enclosed space;
a first hollow electrode enclosure disposed in said space, said first enclosure being open at both ends, being electrically conductive and containing non-consumable, electrically conductive pellets;
screen means for retaining said pellets in said first enclosure;
means for supplying water or a fluid electrolyte to one open end of said first enclosure;
means for supplying an oxygen containing gas to the said open end of said first enclosure;
a second hollow electrode enclosure open at both ends and spaced from said first enclosure in said space, said second enclosure being electriclly conductive and containing electrically conductive pellets;
screen means for retaining said pellets in said second enclosure;
means for supplying a fuel to the region between the two electrodes to move inside said second enclosure, whereby ions produced in said first enclosure react with the fuel and release electrons from the ions to said electrically conductive pellets and enclosure;
flow of said electrolyte sequentially and axially through said enclosures transports ions from the first electrode to the second electrode; and
electrical connections for an external path for flow of said electrons from said second enclosure to said first enclosure.

2. Fuel cell apparatus as defined in claim 1, including:
a series of electrode enclosures corresponding to said first electrode enclosure disposed in laterally spaced relation to each other;
a series of electrode enclosures corresponding to said second electrode enclosure disposed in laterally spaced relation to each other and above said first electrode enclosures;
an outer casing within which said first and second electrode enclosures are installed;
an electrically non-conducting partition in said casing around and between said first electrode enclosures; and
an electrically non-conducting partition in said casing around and between said second electrode enclosures.

3. Fuel cell apparatus as defined in claim 1, wherein:
a plurality of first and second electrode enclosures are disposed in superimposed, alternating relation in a portion of a borehole in which the hydrostatic head of a liquid electrolyte or water provides an elevated pressure.

4. Fuel cell apparatus as defined in claim 3, wherein:
said first electrode enclosures are connected to the second electrode enclosures above by first passage means of electrically non-conducting material; and
said second electrode enclosures are connected to the first electrode enclosures above by second passage means of electrically non-conductive material.

5. Fuel cell apparatus as defined in claim 4, wherein:
the lower end of each of said first electrode enclosures is provided with a screen for deflecting ash from combustion of the particles in a second electrode enclosure below and the corresponding passage means is provided with apertures for outflow of such ash.

6. Fuel cell apparatus as defined in claim 1, wherein:
said fuel comprises a slurry or suspension of particles of fuel in water or fluid electrolyte.

7. Fuel cell apparatus as defined in claim 3, including:
means providing a constriction between a second and first electrode to accelerate flow of water or electrolyte between said enclosures.

8. Fuel cell apparatus as defined in claim 1, wherein:
said second electrode enclosure receives large pieces of fuel in the open end thereof opposite said first electrode enclosure.

9. Fuel cell apparatus as defined in claim 1, wherein: said pellets are formed of catalytic material.

10. A method of operating a fuel cell, which comprises:

passing an electrolyte composed of water, with or without an ionized solute, at an elevated pressure sequentially and exially through at least two hollow, electrically conductive, spaced electrode enclosures containing non-consumable, electrically conductive pellets, each said electrode enclosure being open at both ends and provided with screen means to retain said pellets in the respective enclosure;

supplying an oxidizing gas to the open end of said first electrode enclosure opposite said second electrode enclosure;

supplying fuel to the region between said electrodes or inside said second electrode enclosure, said fuel being particles incorporated into an aqueous slurry or suspension and the particles thereof being of a size to move through the openings of said screen means; and causing said electrolyte to move at a sufficiently rapid rate to fluidize said pellets and to transport the ions formed at said first electrode into the second electrode against the prevailing voltage gradient which exists between the two electrodes of the cell.

11. A method as defined in claim 10, including: providing an elevated pressure for each said electrode by the hydrostatic head of the electrolyte in a borehole.

12. Fuel cell apparatus comprising:
an enclosed space;
means for supplying liquid electrolyte to said space;
at least one upright fuel cell disposed within said space, comprising:
a housing having a top and a depending outer wall;
a first, inner, porous electrode depending from the top of said housing and surrounding an inner space;
means for supplying a first reactant gas to said inner space;
a second, outer, porous electrode depending from said top and surrounding said first electrode to form an intermediate space between said electrodes and an outer space between said second electrode and said outer wall;
means for venting said intermediate space through said housing top;
means for supplying a second reactant gas to said outer space;
means for electrically insulating said electrodes from each other;
each said electrode having an impervious, electrically non-conducting, downward extension;
a first electrical conductor connected electrically to said first electrode;
a second electrical conductor connected electrically to said second electrode; and
said second, outer electrode extension depending for a greater distance than said first, inner electrode extension, whereby inert gases from said inner space are guided into said intermediate space to bubble upwardly and simultaneously depolarize the electrodes by gas lifting the electrolyte and reaction products from said intermediate space to provide a continued influx of fresh, concentrated electrolyte into said intermediate space.

13. Fuel cell apparatus as defined in clim 12, including:
means for producing an elevated pressure in at least the zone of said space in which said fuel cell or cells are located.

14. Fuel cell apparatus as defined in claim 13, wherein:
said enclosed space is provided by a vessel extending downwardly in a borehole and the elevated pressure is provided by the hydrostatic head of said electrolyte liquid and liquid reaction products;
a plurality of said fuel cells are disposed one above the other in a vertical arrangement, within said pressure zone; and
said fuel cells are provided with a bottom plate spaced below said electrodes and an upstanding rim around the periphery of said plate, said rim surrounding and extending to a level above the lower edge of said outer wall.

15. Fuel cell apparatus as defined in claim 12, wherein:
said lower edges of said first electrode extension and said outer wall are serrated.

* * * * *